United States Patent [19]
Nishizawa et al.

[11] 3,889,164
[45] June 10, 1975

[54] POSITION CONTROL SYSTEM USING MAGNETIC FORCES FOR CORRECTING THE INCLINATION OF A CONTROLLED MEMBER INCLUDING A TORSIONAL MOUNTING

[75] Inventors: Junichi Nishizawa, Sendai; Wasaburo Ichinose, Tachikawa, both of Japan

[73] Assignees: Handotai Kenkyu Shinkokai, Japan; Kokusai Denki Kabushiki Kaisha, Japan

[22] Filed: Jan. 24, 1973

[21] Appl. No.: 326,187

[52] U.S. Cl. ............... 318/640; 318/577; 356/106; 356/110; 318/594; 318/687; 318/603
[51] Int. Cl. ............................................. G05b 1/06
[58] Field of Search ........... 318/640, 687, 594, 577, 318/603; 356/106, 110

[56] References Cited
UNITED STATES PATENTS

| | | | |
|---|---|---|---|
| 3,007,097 | 10/1961 | Shelley et al. | 318/640 X |
| 3,449,754 | 6/1969 | Stutz | 318/687 X |
| 3,457,422 | 7/1969 | Rottmann | 318/640 X |
| 3,466,514 | 9/1969 | Brunner | 318/640 X |
| 3,501,683 | 3/1970 | Webb | 318/687 |
| 3,708,657 | 1/1973 | Kelling | 318/640 UX |
| 3,719,879 | 3/1973 | Marcy | 318/640 X |
| 3,728,607 | 4/1973 | Isak | 318/640 X |

*Primary Examiner*—T. E. Lynch
*Attorney, Agent, or Firm*—Robert E. Burns; Emmanuel J. Lobato; Bruce L. Adams

[57] ABSTRACT

A position control system using magnetic forces, in which at least one pole of an electromagnet is opposed to a magnetic substance of a controlled object through an air gap therebetween so that a magnetic circuit including the magnetic substance, the air gap and the electromagnet is provided. The width of the air gap is preset to a value more than a predetermined width when the control curret is zero. The controlled object is supported by at least one spring so as to be movable along a direction in which the magnetic force functions between the electromagnet and the magnetic substance. The control current of the electromagnet is controlled for adjusting the magnetic force and also a width of the air gap so as to obtain a desired position of the controlled object along the above mentioned direction. The magnetic flux of the magnetic circuit is saturated at a condition where the air gap reaches the predetermined width. The elastic force of the spring is balanced with the magnetic force within the elastic region of the spring at the above mentioned desired position. The inclination of the controlled object with respect to the direction is detected by use of two light beams and compensated by controlling a controlled current applied to a correcting electromagnet, which is opposed to a corner of the controlled object received the tension of a torsion spring along the direction of the inclination.

4 Claims, 4 Drawing Figures

3,889,164

POSITION CONTROL SYSTEM USING MAGNETIC FORCES FOR CORRECTING THE INCLINATION OF A CONTROLLED MEMBER INCLUDING A TORSIONAL MOUNTING

This invention relates to a position control system and, more particularly, to a position control system using magnetic forces correctable of inclination of a controlled object.

One of the inventors already proposed a precise position control system using magnetic force, which is disclosed in U.S. patent application Ser. No. 238,051 filed on Mar. 27, 1972. However, if inclination of the controlled object occurs with respect to the controlled direction of the controlled object, such inclination cannot be compensated in the proposed system.

An object of this invention is to provide a position control system using magnetic forces capable of automatically compensating the inclination of a controlled object with respect to the controlled direction of the controlled object.

A position control system using magnetic forces is proposed in the copending application Ser. No. 238,051 filed on Mar. 27, 1972, in which at least one pole of an electromagnet is opposed to a magnetic substance of a controlled object through an air gap therebetween so that a magnetic circuit including the magnetic substance, the air gap and the electromagnet is provided. The width of the air gap is preset to a value more than a predetermined width when the control circuit is zero. The control object is supported by at least one spring so as to be movable along a controlled direction in which the magnetic force functions between the electromagnetic and the magnetic substance. The control current of the electromagnet is controlled for adjusting the magnetic force and also a width of the air gap so as to obtain a desired position of the controlled object along the above mentioned controlled. The magnetic flux of said magnetic circuit is saturated at a condition where said air gap reaches the predetermined width.

In accordance with the principle of this invention, second supporting means including a tortion spring which acts along the direction of the inclination of the controlled object is provided for supporting the controlled object so as to be movable along the direction of inclination. A correcting electromagnet, at least one pole of which is opposed to a corner of the controlled object through an air gap therebetween, is provided so that a magnetic circuit including the magnetic substance, the air gap and the correcting electromagnet is formed. Detection means comprising a pair of interferrometers is provided for detecting the inclination of the controlled object by use of two light beams. Moreover, correcting control means coupled to the correcting electromagnet and the detection means is provided for controlling the control circuit of the correcting electromagnet so as to compensate the inclination of the controlled object.

The principle, objects, construction and operations of this invention will be clearly understood from the following detailed description taken in conjunction with the accompanying drawings, in which.

Figure 1:
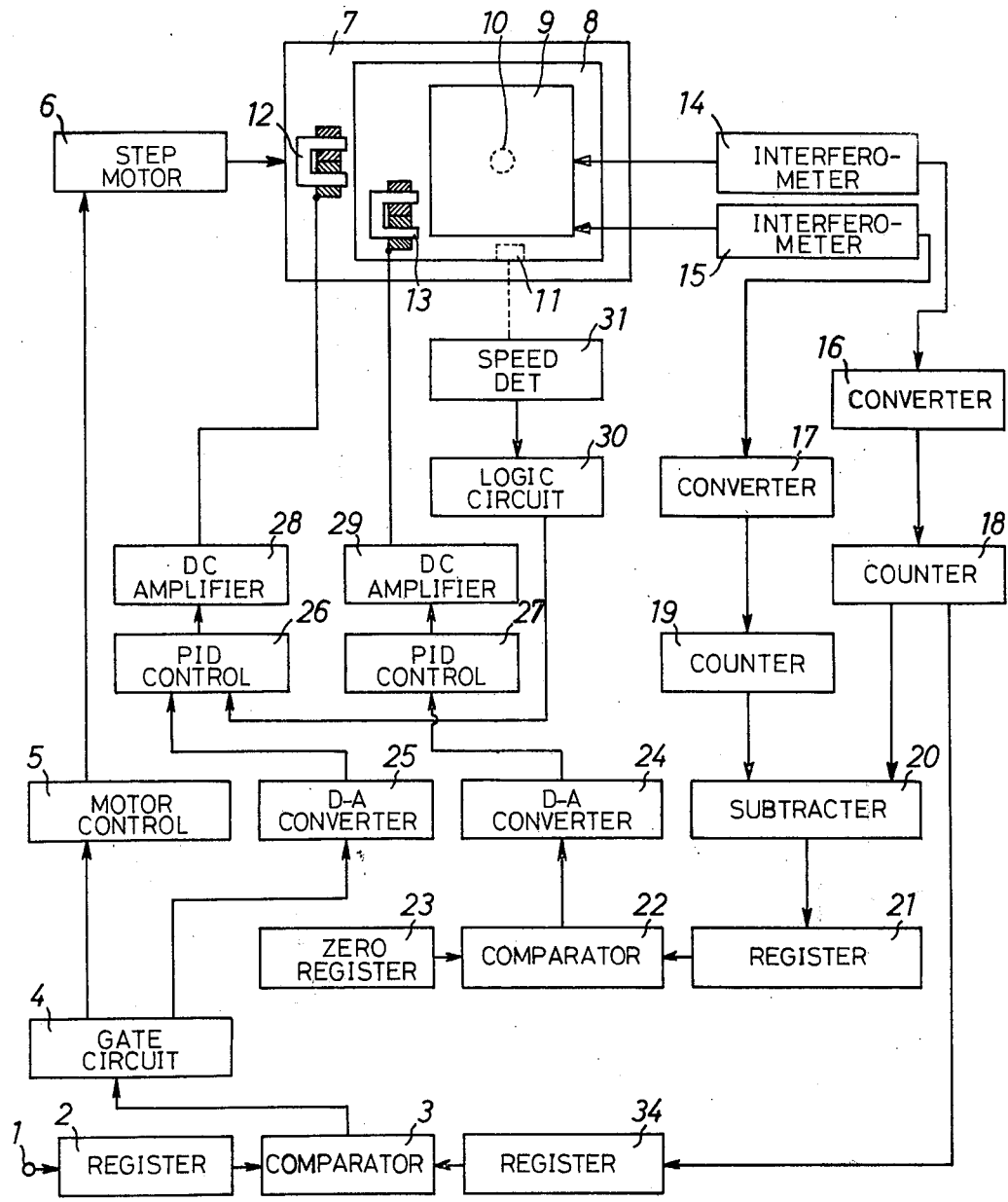
FIG. 1 is a block diagram illustrating an embodiment of this invention.

In an embodiment shown in FIG. 1, a control code unit indicative of a desired position of a control object 9 is applied through an input terminal 1 and temporarily stored in a register 2. An interferometer 14 detects a position of the controlled object 9 with respect to a reference position. A detected output of the interferometer 14 is applied to a converter 16, in which the detected output is converted to pulses. The number of the converted pulses represents a level of the detected output of the interferometer 14. A counter 18 is a reversible counter, which counts the output pulses of the converter 16 with reference to the polarity of the detected output of the interferometer 14. The counting state of the counter 18 is then stored in a register 34. A comparator 3 compares contents of the registers 2 and 34, to each other so that a control code indicative of a difference between contents of the registers 2 and 34 is applied to a gate circuit 4. Upper digits of the control code controls a step motor 6 through a motor control 5 to perform coarse control of a supporting plate 7. A lowest digit of the control code is converted to an analogue control signal at a D-A converter 25 when the upper digits becomes zero as mentioned below. The analogue control signal from the D-A converer 25 is applied, through a PID control 26 and a dc amplifier 28, to an electromagnet 12 to perform precise position control of the control object 9. A speed detector 31 detects a travelling speed of the controls object 9 and controlled the PID control 26 through a logic circuit 30 to accelerate the establishment of the controlled object 9 to a control position.

Figure 2A:
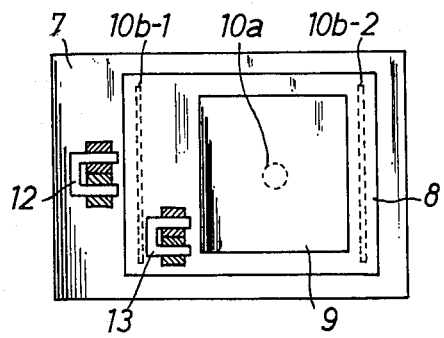
FIGS. 2A and 2B are respectively a plane view and an elevation illustrating a modification of a control table mechanism in this invention.
Figure 2B:
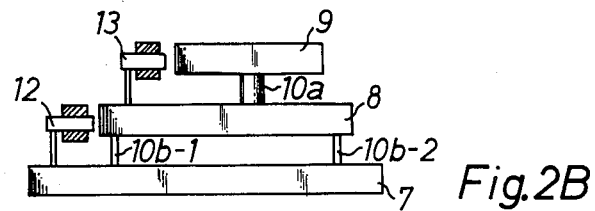

The step motor 6 shifts the supporting table 7 in a coarse manner by a conventional screw-nut mechanism for example. Another supporting plate 8 having a magnetic substance at least an edge part thereof is supported by a pair of plate springs 10b-1 and 10b-2 as shown in FIGS. 2A and 2B, which are arranged in parallel with each other and at right angles with the movable direction of the controlled object 9, in which direction a magnetic force functions between the electromagnet 12 and a magnetic substance associated with the supporting plate 8. Each one edge of the plate springs 10b-1 and 10b-2 is coupled to the supporting plate 8 while each of the other edges of the plate springs 10b-1 and 10b-2 is fixed to the plate 7.

A torsion spring 10 (10a) supports substantially a center portion of the object 9 having a magnetic substance at at least an edge part thereof, so that the controlled object 9 is supported on the supporting table 8 by the use of the torsion spring 10 as shown in FIGS. 1, 2A and 2B.

A interferometer 15 detects the position of a corner of the controlled object 9 with respect to the reference position. A detected output of the interferometer 15 is applied to a converter 17, in which the detected output is converted to pulses. The number of the converted pulses represents a level of the detected output of the interferometer 15. A counter 19 is a reversible counter 19, which counts the output pulses of the converter 17 with reference to the polarity of the detected output of the interferometer 15. A difference between the respective counting states of the counters 18 and 19 is obtained by a subtracter 20 and then stored in a register 21. An initial difference between the counting states of the counters 18 and 19 is preset in a zero register 23. A comparator 22 generates a control code indicative of a difference between the contents of the registers 21 and 23. The obtained control code is applied to a D-A converter therein 24 and converted to an analogue control signal. The analogue control signal is applied, through a PID control 27 and a dc amplifier 29, to an electromagnet 13 to compensate the inclination of the control object 9 with respect to the moving direction of the control object 9.

As a result of the above construction, the position of the supporting plate 7 is at first controlled by the upper digits of the control code of the comparator 3. After the upper digits of the control code assume zero, the lowest digit of the control code controls the PID control 26 so that the lowest digit is reduced to zero. In response to the application of the lowest digit to the PID control 26, the position of the supporting plate 8 is controlled on the supporting plate 7 by the electromagnet 12. In this case, if the position of the controlled object 9 has inclination with respect to an initial position of the controlled object 9, which is indicated by the preset value of the zero register 23, the inclination is detected and compensated by a compensating circuit of this invention comprising the interferometers 14 and 15, the converters 16 and 17, the counters 18 and 19, the subtracter 20, the registers 21 and 23, the comparator 22, the D-A converter 24, the PID control 27, the dc amplifier 29, the electromagnet 13 and the torsion spring 10. Accordingly, the position of the controlled object 9 is automatically controlled to a desired position indicated by the code unit from the input terminal 1, while the inclination of the controlled object 9 is also compensated in the above automatic manner.

Figure 3:
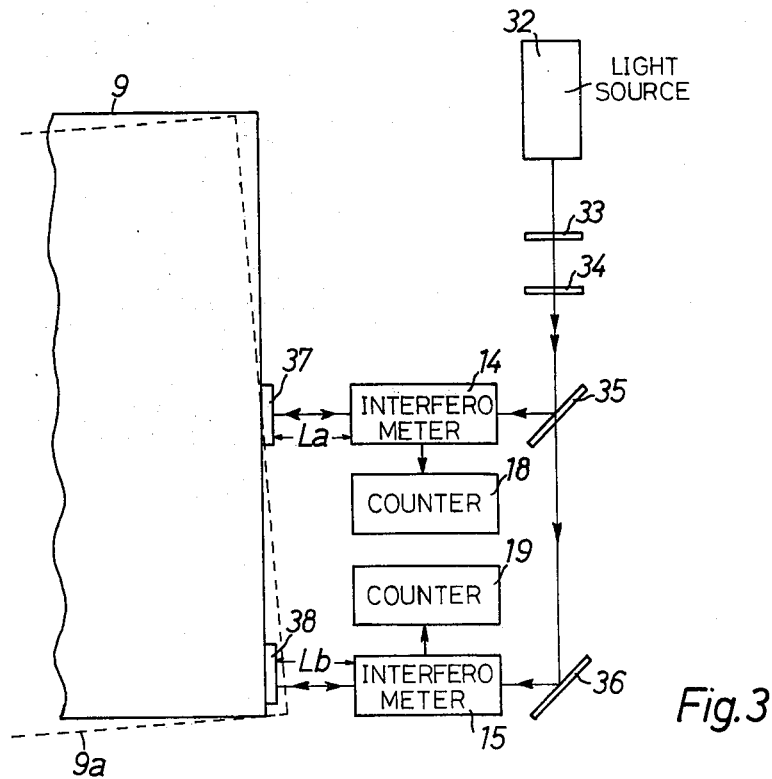
FIG. 3 is a block diagram illustrating an example of a pair of interferrometers employed in this invention.

With reference to FIG. 3, the interferometers 14 and 15 are actually associated with an optical system. A light beam is generated from a light source 32, such as a He-Ne monochromatic laser or a mercury-vapor lamp and then applied, through polar screens 33 and 34, to a beam splitter 35. A part of the light divided at the beam splitter 35 is applied to the interferometer 14, while the other part of the light is applied to the interferometer 15 through a plane mirror 36. A light beam from the interferometer 14 is reflected by a plane mirror 37 provided at the center portion of the edge of the controlled object 9. A light beam from the interferometer 15 is reflected by a plane mirror 38 provided at a corner of the edge of the control object 9. A distance $La$ between the interferometer 14 and the plane mirror 37 is indicated in the counter 18, while a distance $Lb$ between the interferometer 15 and the plane mirror 38 is indicated in the counter 19. The converters 16 and 17 are omitted in FIG. 3 for simple illustration. If the control object 9 assumes an initial position as shown by the solid rectangular, the illustrated optical system detects inclination of the controlled object 9 shown by a dotted rectangle 9a. This inclination is effectively eliminated in accordance with this invention as described in detail above.

The torsion spring 10a may be replaced by four bar springs, which are provided on the supporting plate 8 so as to support four corners of the control object 9 having a rectangular configuration. Two or four electromagnets 13 may be provided to apply a couple of correcting magnetic forces to the controlled object 9 with respect to the center axis of the supporting point or points thereof.

What we claim is:

1. A position control system using magnetic forces for correcting the position and inclination of a controlled member relative to a reference position comprising:

a first controlled member, at least a part of which is composed of a magnetic substance;

a first electromagnet having at least one pole opposed to the magnetic substance of said first controlled member with a first air gap therebetween, the magnetic substance, the first air gap and the electromaget defining a electromagnet magnetic circuit;

presetting means for presetting the width of the first air gap to a width greater than a predetermined width;

first supporting means including at least one spring for moveably supporting said first controlled member so as to be moveable along a line of action of a first magnetic force developed between the first electromagnet and the magnetic substance;

first control means coupled to said first electromagnet for controlling a control current flowing through said first electromagnet to adjust said magnetic force and to adjust the width of said first air gap so as to obtain the desired position of said first controlled member along said line of action of said first magnetic force, said magnetic circuit being saturated at a condition where said first air gap reaches said predetermined width, an elastic force developed by said spring being balanced by said first magnetic force within the elastic region of the spring at said conditon;

a second controlled member, at least a part of which is composed of a magnetic substance;

second supporting means comprising a torsion spring for rotatably supporting said second controlled member on said first controlled member;

a correcting electromagnet having at least one pole opposed to the magnetic substance of said second controlled member at a point along a line of action of a force developed by said correcting electromagnet remote from said second supporting means and a second air gap between said correcting electromagnet and said second supporting means, the magnetic substance of said second supporting means, the second air gap and the correcting electromagnet defining a second magnetic circuit;

detection means comprising a pair of interferrometers for detecting the inclination of said second controlled member relative to its position prior to the application of said first magnetic force to said first controlled member by use of two light beams; and correcting control means coupled to said correcting electromagnet and said detection means for controlling a second control current flowing through said correcting electromagnet so as to rotate said second controlled member to eliminate said inclination of said second controlled member.

2. A position control system according to claim 1, in which the torsion spring of the second supporting means is disposed on the first controlled member so as to support substantially the center of the second controlled member.

3. A position control system according to claim 1, in which the first supporting means includes four bar springs disposed to support four corners of the first controlled member, the first controlled member having a rectangular configuration.

4. A position control system according to claim 1, in which said first supporting means comprises a supporting base, a pair of plate springs arranged parallel with each other and at right angles to said line of action of said first magnetic force, and in which one edge of each of said plate springs is coupled to said first controlled member while the other edge of each of said plate springs is fixed to said supporting base.

* * * * *